(12) United States Patent
Kavuri et al.

(10) Patent No.: US 7,849,266 B2
(45) Date of Patent: *Dec. 7, 2010

(54) METHOD AND SYSTEM FOR GROUPING STORAGE SYSTEM COMPONENTS

(75) Inventors: Srinivas Kavuri, South Plainfield, NJ (US); Anand Prahlad, East Brunswick, NJ (US); Anand Vibhor, Eatontown, NJ (US); Parag Gokhale, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/392,484

(22) Filed: Feb. 25, 2009

(65) Prior Publication Data

US 2009/0157881 A1   Jun. 18, 2009

Related U.S. Application Data

(63) Continuation of application No. 11/269,519, filed on Nov. 7, 2005, now Pat. No. 7,500,053.

(60) Provisional application No. 60/626,076, filed on Nov. 8, 2004, provisional application No. 60/625,746, filed on Nov. 5, 2004.

(51) Int. Cl.
*G06F 12/00* (2006.01)
(52) U.S. Cl. ....................................... 711/114
(58) Field of Classification Search .......... None
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |

(Continued)

FOREIGN PATENT DOCUMENTS

EP   0 259 912   3/1988

(Continued)

OTHER PUBLICATIONS

U.S. Appl. No. 11/269,513, filed Nov. 7, 2005, Prahlad, et al.

(Continued)

*Primary Examiner*—Tuan V Thai
*Assistant Examiner*—Duc T Doan
(74) *Attorney, Agent, or Firm*—Knobbe, Martens, Olson & Bear, LLP

(57) ABSTRACT

Methods and systems are provided for associating a storage system component, e.g. a server, client, machine, sub-client, or other storage system component, with one or more other storage system components into a group. Storage preferences are defined for the group which is automatically associated with each component in the group. The storage preferences define how storage operations are to be performed on the storage system components.

12 Claims, 8 Drawing Sheets

U.S. PATENT DOCUMENTS

| | | | |
|---|---|---|---|
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,388,243 A | 2/1995 | Glider et al. |
| 5,410,700 A | 4/1995 | Fecteau et al. |
| 5,448,724 A | 9/1995 | Hayashi |
| 5,465,359 A | 11/1995 | Allen et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,829,023 A | 10/1998 | Bishop |
| 5,829,046 A | 10/1998 | Tzelnic et al. |
| 5,875,478 A | 2/1999 | Blumenau |
| 5,875,481 A | 2/1999 | Ashton et al. |
| 5,887,134 A | 3/1999 | Ebrahim |
| 5,890,159 A | 3/1999 | Sealby et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,137,864 A | 10/2000 | Yaker |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,295,541 B1 | 9/2001 | Bodnar et al. |
| 6,301,592 B1 | 10/2001 | Aoyama et al. |
| 6,304,880 B1 | 10/2001 | Kishi |
| 6,324,581 B1 | 11/2001 | Xu et al. |
| 6,328,766 B1 | 12/2001 | Long |
| 6,330,570 B1 | 12/2001 | Crighton et al. |
| 6,330,572 B1 | 12/2001 | Sitka |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,374,266 B1 | 4/2002 | Shnelvar |
| 6,374,336 B1 | 4/2002 | Peters et al. |
| 6,385,673 B1 | 5/2002 | DeMoney |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,505,307 B1 | 1/2003 | Stell et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,571,310 B1 | 5/2003 | Ottesen |
| 6,581,143 B2 | 6/2003 | Gagne et al. |
| 6,631,442 B1 | 10/2003 | Blumenau |
| 6,631,493 B2 | 10/2003 | Ottesen et al. |
| 6,658,436 B2 | 12/2003 | Oshinsy et al. |
| 6,658,526 B2 | 12/2003 | Nguyen et al. |
| 6,732,124 B1 | 5/2004 | Michihiko et al. |
| 6,757,794 B2 | 6/2004 | Cabrera et al. |
| 6,789,161 B1 | 9/2004 | Blendermann et al. |
| 6,791,910 B1 | 9/2004 | James et al. |
| 6,859,758 B1 | 2/2005 | Prabhakaran et al. |
| 6,886,020 B1 | 4/2005 | Zahavi et al. |
| 6,952,758 B2 | 10/2005 | Chron et al. |
| 6,965,968 B1 | 11/2005 | Touboul et al. |
| 6,968,351 B2 | 11/2005 | Butterworth |
| 6,973,553 B1 | 12/2005 | Archibald, Jr. et al. |
| 6,983,351 B2 | 1/2006 | Gibble et al. |
| 7,003,641 B2 | 2/2006 | Prahlad et al. |
| 7,035,880 B1 | 4/2006 | Crescenti et al. |
| 7,062,761 B2 | 6/2006 | Slavin et al. |
| 7,069,380 B2 | 6/2006 | Ogawa et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,117,246 B2 | 10/2006 | Christenson et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,155,633 B2 | 12/2006 | Tuma et al. |
| 7,159,110 B2 | 1/2007 | Douceur et al. |
| 7,174,433 B2 | 2/2007 | Kottomtharayil et al. |
| 7,246,140 B2 | 7/2007 | Therrien et al. |
| 7,246,207 B2 | 7/2007 | Kottomtharayil et al. |
| 7,246,272 B2 | 7/2007 | Cabezas et al. |
| 7,269,612 B2 | 9/2007 | Devarakonda et al. |
| 7,278,142 B2 | 10/2007 | Bandhole et al. |
| 7,287,047 B2 | 10/2007 | Kavuri |
| 7,287,252 B2 | 10/2007 | Bussiere et al. |
| 7,293,133 B2 | 11/2007 | Colgrove et al. |
| 7,346,623 B2 | 3/2008 | Prahlad et al. |
| 7,380,072 B2 | 5/2008 | Kottomtharayil et al. |
| 7,467,167 B2 | 12/2008 | Patterson |
| 7,472,238 B1 | 12/2008 | Gokhale |
| 7,490,207 B2 | 2/2009 | Amarendran et al. |
| 7,500,053 B1 | 3/2009 | Kavuri et al. |
| 7,536,291 B1 | 5/2009 | Retnamma et al. |
| 2001/0034812 A1 | 10/2001 | Ignatius et al. |
| 2002/0004883 A1 | 1/2002 | Nguyen et al. |
| 2002/0029281 A1 | 3/2002 | Zeidner et al. |
| 2002/0040405 A1 | 4/2002 | Gold |
| 2002/0049778 A1 | 4/2002 | Bell et al. |
| 2002/0049803 A1 | 4/2002 | Bandhole et al. |
| 2002/0069369 A1 | 6/2002 | Tremain |
| 2002/0107877 A1 | 8/2002 | Whiting et al. |

| | | | | | | |
|---|---|---|---|---|---|---|
| 2002/0194340 | A1* | 12/2002 | Ebstyne et al. ............. 709/226 | GB | 2366048 | 2/2002 |
| 2003/0014433 | A1 | 1/2003 | Teloh et al. | WO | WO 95/13580 | 5/1995 |
| 2003/0014607 | A1 | 1/2003 | Slavin et al. | WO | WO 99/12098 | 3/1999 |
| 2003/0016609 | A1 | 1/2003 | Rushton et al. | WO | WO 99/14692 | 3/1999 |
| 2003/0033308 | A1 | 2/2003 | Patel et al. | WO | WO 99/17204 | 4/1999 |
| 2003/0051097 | A1 | 3/2003 | Ottesen et al. | WO | WO 2004/090788 | 4/2004 |
| 2003/0061491 | A1 | 3/2003 | Jaskiewicz et al. | WO | WO 2005/055093 | 6/2005 |
| 2003/0163652 | A1 | 8/2003 | Tsuge | | | |
| 2003/0169733 | A1 | 9/2003 | Gurkowski et al. | | | |
| 2003/0188114 | A1 | 10/2003 | Lubbers et al. | | | |
| 2003/0225801 | A1 | 12/2003 | Devarakonda et al. | | | |
| 2004/0010487 | A1 | 1/2004 | Prahlad et al. | | | |
| 2004/0073716 | A1 | 4/2004 | Boom et al. | | | |
| 2004/0088432 | A1 | 5/2004 | Hubbard et al. | | | |
| 2004/0107199 | A1 | 6/2004 | Dairymple et al. | | | |
| 2004/0167941 | A1 | 8/2004 | Prahlad et al. | | | |
| 2004/0193953 | A1 | 9/2004 | Callahan et al. | | | |
| 2004/0221114 | A1 | 11/2004 | Kottomtharayil | | | |
| 2004/0230829 | A1* | 11/2004 | Dogan et al. ............. 713/200 | | | |
| 2005/0033755 | A1 | 2/2005 | Gokhale et al. | | | |
| 2005/0033756 | A1 | 2/2005 | Kottomtharayil et al. | | | |
| 2005/0033800 | A1 | 2/2005 | Kavuri et al. | | | |
| 2005/0044114 | A1 | 2/2005 | Kottomtharayil et al. | | | |
| 2005/0086443 | A1 | 4/2005 | Mizuno et al. | | | |
| 2005/0114406 | A1 | 5/2005 | Borthakur et al. | | | |
| 2005/0114477 | A1 | 5/2005 | Willging et al. | | | |
| 2005/0131900 | A1 | 6/2005 | Palliyll et al. | | | |
| 2005/0144520 | A1 | 6/2005 | Tuma et al. | | | |
| 2005/0166011 | A1 | 7/2005 | Burnett et al. | | | |
| 2005/0172093 | A1 | 8/2005 | Jain | | | |
| 2005/0246568 | A1 | 11/2005 | Davies | | | |
| 2005/0256972 | A1 | 11/2005 | Cochran et al. | | | |
| 2005/0262296 | A1 | 11/2005 | Peake | | | |
| 2006/0005048 | A1 | 1/2006 | Osaki et al. | | | |
| 2006/0010227 | A1 | 1/2006 | Atluri | | | |
| 2006/0044674 | A1 | 3/2006 | Martin et al. | | | |
| 2006/0053305 | A1 | 3/2006 | Wahlert et al. | | | |
| 2006/0224846 | A1 | 10/2006 | Amarendran et al. | | | |
| 2006/0224852 | A1 | 10/2006 | Kottomtharayil et al. | | | |
| 2006/0230244 | A1 | 10/2006 | Amarendran et al. | | | |
| 2006/0242489 | A1 | 10/2006 | Brockway et al. | | | |
| 2007/0130430 | A1 | 6/2007 | Devassy et al. | | | |
| 2007/0186042 | A1 | 8/2007 | Kottomtharayil et al. | | | |
| 2008/0016126 | A1 | 1/2008 | Kottomtharayil et al. | | | |
| 2008/0229037 | A1 | 9/2008 | Bunte et al. | | | |
| 2008/0243879 | A1 | 10/2008 | Gokhale et al. | | | |
| 2008/0243914 | A1 | 10/2008 | Prahlad et al. | | | |
| 2008/0243957 | A1 | 10/2008 | Prahlad et al. | | | |
| 2008/0243958 | A1 | 10/2008 | Prahlad et al. | | | |
| 2009/0319585 | A1 | 12/2009 | Gokhale | | | |

FOREIGN PATENT DOCUMENTS

| | | |
|---|---|---|
| EP | 0405926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| EP | 1 174 795 | 1/2002 |
| EP | 1 115 064 A3 | 12/2004 |

OTHER PUBLICATIONS

U.S. Appl. No. 11/269,520, filed Nov. 7, 2005, Gokhale, et al.
U.S. Appl. No. 11/269,521, filed Nov. 7, 2005, Prahlad, et al.
Armstead, et al., "Implementation of a Campus-wide Distributed Mass Storage Service: The Dream vs. Reality," IEEE, 1995, pp. 190-197 and 199.
Arneson, Davic A., Control Data Corporation, Development of Omniserver; Mass Storage Systems, 1990, pp. 88-93.
Cabrera, et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Jander, M., "Launching Storage-Area Net," Data Communications, US, McGraw Hill, NY, vol. 27, No. 4 (Mar. 21, 1998), pgs. 64-72.
Jason Gait, "The Optical File Cabinet: A Random-Access File System for Write-Once Optical Disks," IEEE Computer, vol. 21, No. 6, pp. 11-22 (1988) (see in particular figure 5 in p. 15 and recitation in claim 5).
Rosenblum, et al., "The Design and Implementation of a Log-Structured File System," Operating Systems Review SIGOPS, vol. 25, No. 5, New York, US, pp. 1-15 (May 1991).
International Search Report for International Application No. PCT/US05/40656; dated Mar. 1, 2007; 1 page.
U.S. Appl. No. 11/269,119, filed Nov. 7, 2005, Amarendran et al.
U.S. Appl. No. 11/269,136, filed Nov. 7, 2005, Retnamma et al.
U.S. Appl. No. 11/269,515, filed Nov. 7, 2005, Gokhale.
U.S. Appl. No. 11/269,519, filed Nov. 7, 2005, Kavuri et al.
U.S. Appl. No. 11/950,376, filed Dec. 4, 2007, Bunte et al.
U.S. Appl. No. 11/963,623, filed Dec. 21, 2007, Gokhale et al.
U.S. Appl. No. 12/058,178, filed Mar. 28, 2008, Prahlad et al.
U.S. Appl. No. 12/058,317, filed Mar. 28, 2008, Prahlad et al.
U.S. Appl. No. 12/058,367, filed Mar. 28, 2008, Prahlad et al.
U.S. Appl. No. 12/145,347, filed Jun. 24, 2008, Gokhale.
U.S. Appl. No. 12/167,933, filed Jul. 3, 2008, Gokhale.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009.
Commvault Systems, Inc., Continuous Data Replicator 7.0, Product Data Sheet, 2007.
Farley, "Building Storage Networks," pp. 328-331, Osborne/McGraw-Hill, 2000.
Gibson, et al., "Network Attached Storage Architecture," pp. 37-45, ACM, Nov. 2000.
Recycle Bin (Windows), Aug. 2007, Wikipedia, pp. 1-3.
Written Opinion; International Application No. PCT/US05/40606; mailed Mar. 1, 2007; 5 pages.

* cited by examiner

METHOD AND SYSTEM FOR GROUPING STORAGE SYSTEM COMPONENTS

PRIORITY CLAIM

This application is a continuation of and claims priority to U.S. application Ser. No. 11/269,519, titled METHOD AND SYSTEM FOR GROUPING STORAGE SYSTEM COMPONENTS, filed Nov. 7, 2005; and claims the benefit of U.S. provisional application No. 60/626,076 titled SYSTEM AND METHOD FOR PERFORMING STORAGE OPERATIONS IN A COMPUTER NETWORK, filed Nov. 8, 2004, and U.S. provisional application No. 60/625,746 titled STORAGE MANAGEMENT SYSTEM filed Nov. 5, 2004, each of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

RELATED APPLICATIONS

This application is related to the following pending applications, each of which is hereby incorporated herein by reference in its entirety:
- application Ser. No. 09/354,058, titled Hierarchical Backup And Retrieval System, filed Jul. 15, 1999;
- application Ser. No. 10/818,749, titled System And Method For Dynamically Performing Storage Operations In A Computer Network, filed Apr. 5, 2004;
- Application Ser. No. 60/519,540, titled System And Method For Performing Integrated Storage Operations, filed Nov. 13, 2003;
- Application Ser. No. 60/567,178, titled Hierarchical System And Method For Performing Storage Operations In A Computer Network, filed Apr. 30, 2004;
- application Ser. No. 11/269,520, titled System And Method For Performing Multistream Storage Operations, filed Nov. 7, 2005;
- application Ser. No. 11/269,512, titled System And Method To Support Single Instance Storage Operations, filed Nov. 7, 2005;
- application Ser. No. 11/269,514, titled Method And System Of Pooling Storage Devices, filed Nov. 7, 2005;
- application Ser. No. 11/269,521, titled Method And System For Selectively Deleting Stored Data, filed Nov. 7, 2005;
- application Ser. No. 11/269,515, titled Systems And Methods For Recovering Electronic Information From A Storage Medium, filed Nov. 7, 2005; and
- application Ser. No. 11/269,513, titled Method And System For Monitoring A Storage Network, filed Nov. 7, 2005.

BACKGROUND OF THE INVENTION

Field of the Invention

The invention disclosed herein relates generally to data storage systems in computer networks and, more particularly, to improvements in allocating system resources by automatically grouping storage system components such as hardware, software, or data components.

There are many different computing architectures for storing electronic data. Individual computers typically store electronic data in volatile storage devices such as Random Access Memory (RAM) and one or more nonvolatile storage devices such as hard drives, tape drives, or optical disks that form a part of or are directly connectable to the individual computer. In a network of computers such as a Local Area Network (LAN) or a Wide Area Network (WAN), storage of electronic data is typically accomplished via servers and storage devices accessible via the network. These individual network storage devices may be networkable tape drives, optical libraries, Redundant Arrays of Inexpensive Disks (RAID), CD-ROM jukeboxes, and other devices.

There are also many different system processing and management architectures for such storage systems. One common architecture is a client-server architecture or two-tier architecture. The client-server architecture is a network architecture in which servers are used to manage system operations and components, such as storage operations, storage devices, databases, network traffic and processors, and other operations and components, for clients, which are typically computers running applications.

In general, when a system component, such as a client or a server, or other component, is newly added to the system or reallocated according to system storage requirements, each component must be individually configured in the network storage system. For example, the component must be associated with other existing system components or storage operations, information about network pathways to connect to the new component must be input into the system, and other system configuration requirements must also be entered. This requires that a system administrator set forth a new system configuration each time a new system component is added. In certain small-scale storage systems, adding each new component may be practicable, however, in systems haling thousands of components, adding new components and respective individual configurations for each becomes onerous. There is therefore a need for improved methods for adding and configuring storage system components.

BRIEF SUMMARY OF THE INVENTION

The present invention includes methods and systems for allocating storage system resources by automatically grouping and configuring storage system components.

In one embodiment of the invention, a method and system for grouping networked storage system components is provided. One part of the method involves selecting, among a plurality of storage system components, a first storage system component. In general, the storage system component may be a machine, client, sub-client, server, or other storage component. The first storage system component is generally selected from a list, or other interface, of the system components. The list is preferably generated by querying an index of a storage manager.

Further, in accordance with the method, the first storage system component is associated with a second storage system component into a group, such as a component group.

Data relating to the association of the first and second storage system component is stored as index data, preferably to the index of a storage manager or a media management component. The first and second storage system components may be the same type of entity, such as two clients or two servers. Alternatively, the first and second storage system components may be different entities, e.g. a client is associated with a server. Each storage system component is associated with or assigned at least one storage preference. In one embodiment, the storage preference is a storage policy, sub-client policy, user preference or other storage preference, each further described herein. In another embodiment, the storage preference is defined by a system user or system administrator. In yet another embodiment, the storage preference is a default preference.

According to another embodiment of the invention, a method and system for automatically associating preferences to a storage system component is provided by selecting a storage system component. The selected storage system component is associated with an existing group of one or more storage system components. The existing group has at least one preference, such as a storage policy, sub-client policy, user preference or other storage preference, each further described herein. The at least one preference is thus automatically associated with the selected storage system component associated with the corresponding group. Thus the selected storage system inherits the at least one preference of the group. Data relating to the association of the selected storage system component with the group, and data relating to the at least one preference of the group is typically stored as index data to an index of a storage manager or media management component.

According to another embodiment of the invention, a method and system are provided for automatically associating preferences to a storage system component by identifying at least one storage system component. The storage system component is identified, for example, by querying a storage manager. In addition, characteristics of the storage system component are detected, as further described herein. In accordance with a template, such as a master grouping policy, which sets forth parameters for grouping system components, the at least one storage system component is selected to be added to a group. The storage system component is typically automatically selected by comparing the detected characteristics of the component to the parameters of the template.

The selected storage system component is then assigned to or associated with the group. In general, the group has one or more storage system components and already exists. The group generally has at least one preference, such as a storage policy, sub-client policy, user preference or other storage preference associated with the group. The group's at least one preference is automatically associated with the selected storage system component. Thus, the selected storage system component inherits the at least one preference or policy of the group. In another embodiment of the invention, the association of the group and the preference is stored as index data in the index of the storage manager or media management component.

The present invention further includes methods and systems operating in conjunction with a modular storage system to enable computers on a network to share storage devices on a physical and logical level. An exemplary modular storage system is the GALAXY™ backup, retrieval system, and QiNetix™ available from CommVault Systems of New Jersey. The modular architecture underlying this system is described in the above referenced patent applications, each of which is incorporated herein.

BRIEF DESCRIPTION OF THE DRAWINGS

The invention is illustrated in the figures of the accompanying drawings, which are meant to be exemplary, and not limiting, in which like references are intended to refer to like or corresponding parts, and in which.

DETAILED DESCRIPTION OF THE PREFERRED EMBODIMENT

In the following description of preferred embodiments, reference is made to the accompanying drawings that form a part hereof, and in which are shown by way of illustration embodiments in which the invention may be practiced. It is to be understood that other embodiments may be utilized and procedural and structural changes may be made without departing from the scope of the present invention.

The present invention involves methods and systems for configuring a storage system by grouping components of the system into logical groupings, assigning the groups to storage policies, which define aspects of storage operations, and applying these storage policies to the components in the groups to perform the storage operations. The components upon which these methods may be performed include hardware components, such as clients, hard drives, backup devices, or identifiable portions thereof, software components such as applications residing on clients, and data sources such as data stored within specified directories on client machines or data associated with specific applications. Components may include sub-clients, which generally refers to hardware, software or data portions of clients in the system. Components may be grouped manually, based on user selections, or may be grouped in an automated fashion by identifying common characteristics of components or by applying a template to system components.

The methods described herein may be performed in any storage system. The functionality for creating and maintaining data representing group assignments and associations and with policies, for storing such data and applying the policies is typically provided by a-storage manager for the storage system.

Figure 1:
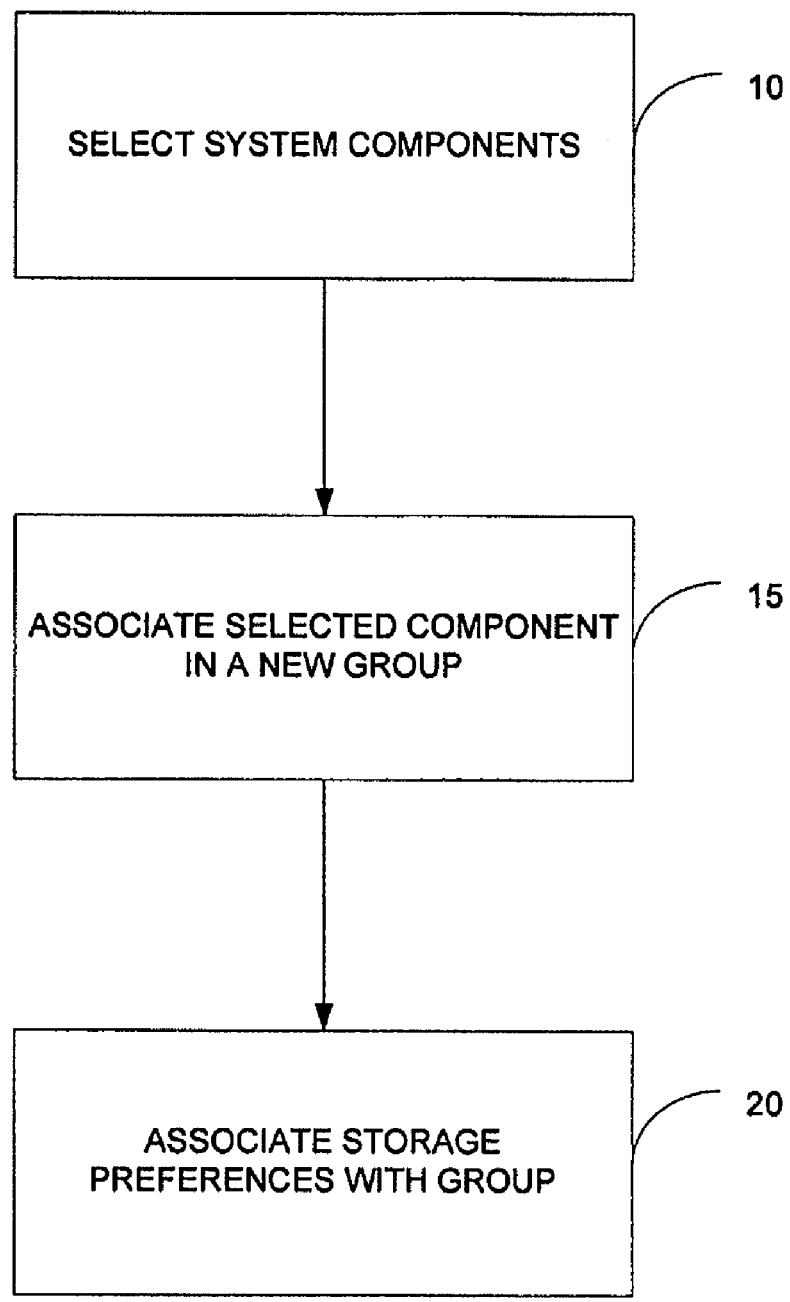
FIG. 1 is a flow diagram presenting a method for grouping storage system components according to one embodiment of the present invention.

Referring to FIG. 1, then, system components are selected, step 10, to be grouped. The selection may be performed through manual input, for example, from a menu, screen or other listing of system components. In general, a system component listing is provided by querying an index or table storing identifiers for system components and includes components such as machines, clients, data agents, sub-clients, or other hardware or software components. The presence of system or network hardware and software components may be input into the index by system administrators or may be automatically discovered by conventional network management systems as known to those of skill in the art. The list of system components will typically include a list of existing component groups in the system, if any. Each system component in the list may be presented together with information about the components, such as type, location, applications used, or other information. A user or administrator may want to group system components, for example, according to component type, component location, department in which the component is used, its role in the enterprise, application type, or other category or characteristic. For manual input, the user or administrator selects the component(s) to group, for example by highlighting, clicking or otherwise selecting the components in a user interface.

The selected components are associated in a group, step 15. The association of the components in the group is accomplished by storing data relating to the association of the group components as index data in an index accessible to a storage manager. Storage preferences are associated with the group, step 20. Assigning preferences to the group causes each of the components in the group to inherit the group preferences. In some embodiments, default storage preferences are automatically assigned to a new group temporarily until a user or administrator defines storage preferences for the group. In other embodiments, a user or administrator manually defines storage preferences for the group. Data relating to the preferences associated with the group is typically stored as index data in the index accessible to the storage manager.

When a system has existing groups, and a new system component is added to the existing group, a user or administrator need not individually configure a new storage policy, sub-client policy, user preference or other defined storage preferences for each new component. In yet another embodiment of the invention, a component may be automatically associated with storage preferences by associating the component with a group, which has associated storage preferences. Thus, inheritance is provided for the new components added to an existing group. Inheritance provides the ability for a component group's predefined definitions of storage policies, sub-client policies, user preferences or other storage preferences to be automatically applied to a client or other system component newly associated with the component group.

An example of the method described in FIG. 1 is as follows. A server is associated with a component group, which has a defined storage policy, sub-client policy, user preferences or other storage preferences. When the server is associated with the existing component group, the server inherits the storage policy, sub-client policy, user preferences or other storage preferences of the group. Data relating to the association of the server in the group and the associated storage preferences is stored as index data. In another embodiment of the invention, the user or administrator may define or amend the storage preferences of the group at any time and the storage preferences for each component in the group is defined or amended accordingly.

Another example of the method described in FIG. 1 involves the grouping of certain data structures across a number of clients in the storage system. For example, if an administrator wished to perform a storage operation, such as a backup operation, on all email files stored on clients according to a single set of preferences or rules, those files would be grouped into a single logical group, which group would then be associated with the storage policy that defined the preferences and procedures to be followed by the storage system for performing the storage operation. Thus, any client device having data belonging to the group would be automatically associated with this policy, without the need to separately configure the client device. The data in these types of sub-clients could be distinct groupings of application data, file system data, operating system data or any other type of grouping. Additionally, data may span multiple sub-clients and sub-clients may be physically located on more than one computer or storage volume.

Figure 2:
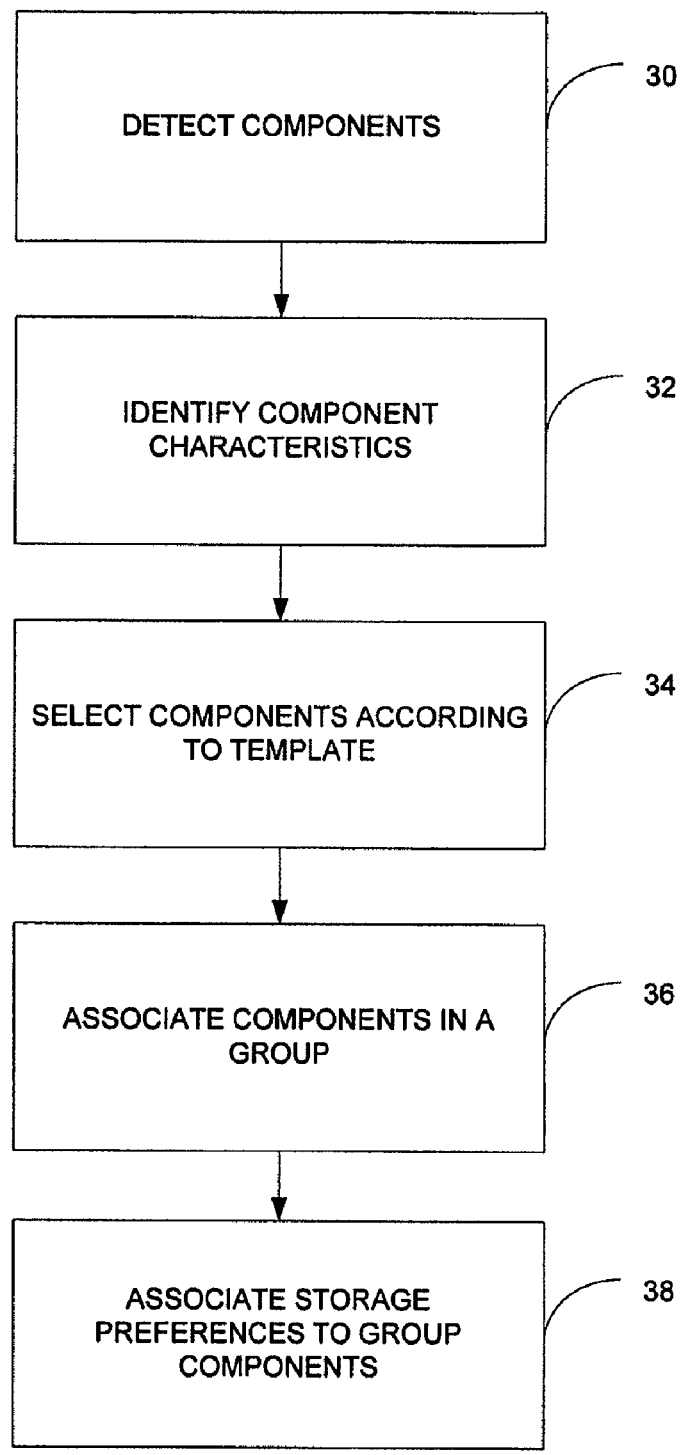
FIG. 2 is a flow diagram presenting a method for automatically associating preferences of a group of storage system components according to one embodiment of the present invention.

Component groups can be automatically created without user input. Referring to FIG. 2, in another embodiment of the invention components are assigned to a group in accordance with one or more master grouping policies or templates. The grouping policy or template sets forth a general policy or templates for grouping components, which includes, for example, parameters for grouping components. The policy or template may be based on characteristics of the component, storage preferences, or other logic. For example, a component running a particular application or a certain type of component may be a parameter for creating a group. As another example, data stored for given software applications or within a defined set of directories on a client may be parameters for group creation. In such a case, the template would define how to locate and identify such components, including for example, by locating certain pathways on a client device or for looking for files having certain name extensions. The grouping policy or template is preferably stored as index data in the index of a storage manager or a media management component.

In general, the system detects components, step 30, to assign to a group. For example, the system detects when a new hardware, software or other system component is added to the system, when a component changes, such as when a characteristic of the component changes, or when such component becomes available. According to one embodiment, the system queries the components or related storage system management components to detect system components to be assigned to a group. According to another embodiment, whenever a component, such as a storage device, such as a client or server, software application or other component is added to the system, or whenever a component changes characteristics, it is automatically detected to be added to a group. The changed characteristics in devices may be detecting by querying storage system components associated with or responsible for those devices to check characteristics. Techniques for doing such checking of device characteristics are described in co-pending patent application Ser. No. 11/269,513, titled METHOD AND SYSTEM FOR MONITORING A STORAGE NETWORK, filed on even date herewith, which application is incorporated herein by reference in its entirety.

The component characteristics are identified, step 32, by the system. In some embodiments, the storage manager index data supplies information regarding a system component to be grouped. In other embodiments, the system automatically detects characteristics of the component. Component characteristics may include, for example, network pathways, processor speed, location, user preferences, client application type, storage type, storage operation type, manager preference, hardware type, software type, department in which it is used, its role in the enterprise server type, or other characteristic. Based on the identified component characteristics, and in accordance with the grouping policy or template, certain components are selected, step 34. The component(s) are selected, as appropriate, when the identified characteristics of the component are equivalent, correspond to, or are otherwise related to the parameters of the grouping policy or template in accordance with a threshold or algorithm defined in the template or policy.

For example, when a new client is added to the system that runs accounting applications, the new client is detected by the storage manager and identified as an accounting department related client. Such a client, or a relevant portion thereof acting as a sub-client, would likely be added to a group of accounting department components, or other component group according to the grouping policy or template for clients running accounting applications. In another example, when a storage device becomes available for storage operations, or otherwise changes state, it is detected by the storage manager and identified as being available, and having particular characteristics, such as storage capacity. The storage device would likely be added to a component group requiring its particular storage capacity, or otherwise in accordance with the grouping policy or template.

The selected component(s) are associated with the group, step 36, in accordance with the grouping policy or template. The association of the selected component(s) is stored as index data in the index of a storage manager. Any preferences associated with the group are automatically associated with the selected component(s) added to the group, step 38. In one embodiment, the association of the group preferences is stored as index data.

In another embodiment, the automatic group assignment and association of storage preferences is a temporary grouping. In this embodiment, a message or alert is sent to a user or administrator regarding the addition of the new component to a group. The user can confirm the grouping, or manually change the grouping if necessary.

As an example of the process set forth in FIG. 2, suppose an administrator of a storage network wants to configure the network such that all data associated with a messaging application such as MICROSOFT EXCHANGE be stored in accordance with one set of preferences, including type of backup device, length of storage, encryption used, etc., while all data representing individual work product of users in the network be stored according to a different set of such preferences. The administrator would establish one template, which locates the standard operating system directories, set up by the messaging application during installation, and would establish a second template to locate directories such as MyDocuments or MyPhotos in which users are expected to store live, production data of their work files. The templates would then be used in the process to assign these directories on each client machine with their respective groups, in this case a first group for messaging sub-clients and a second group for user working files. These groups would be associated with the respective storage policies generated by the administrator. When a storage operation is performed, the storage manager applies the storage policy to the data files in the directories assigned to each respective group, so that all the messaging data files are stored according to the messaging storage policy and all the working files are stored according to the user working file storage policy.

Figure 3:
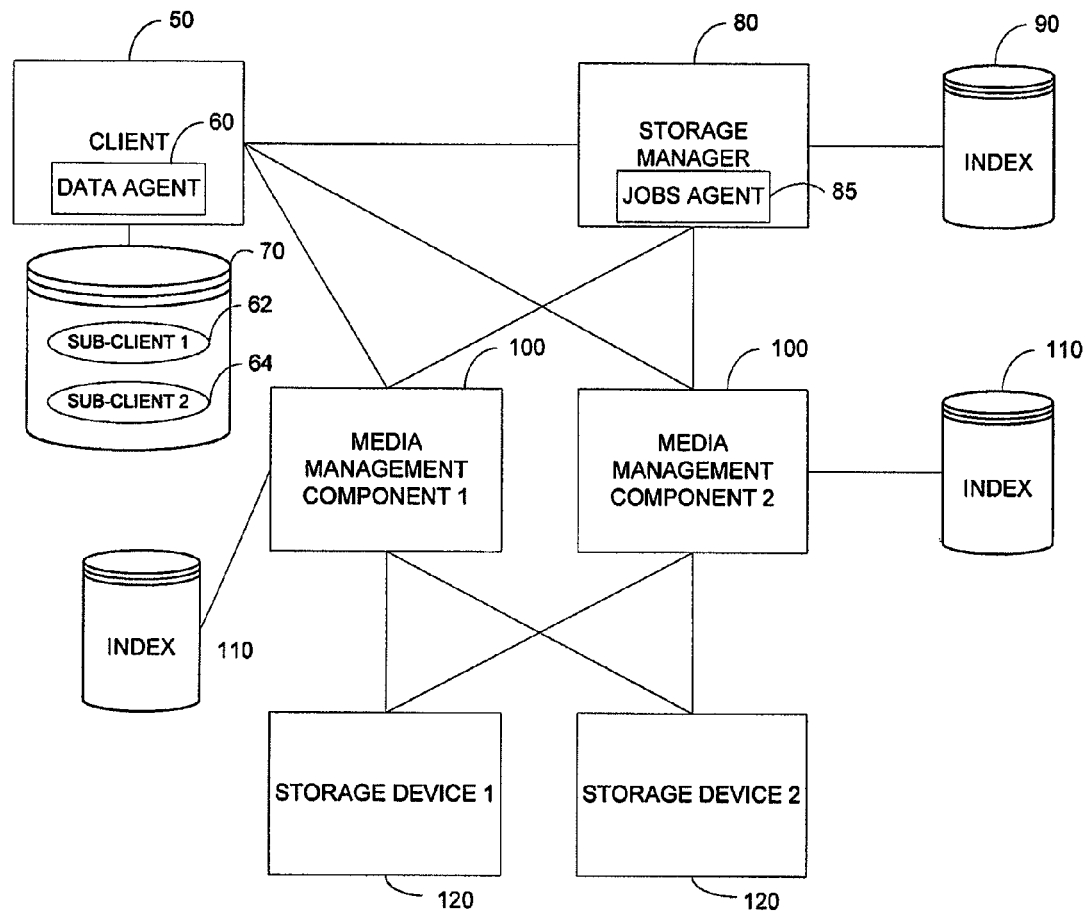
FIG. 3 is block diagram showing a high-level view of the network architecture and components according to one embodiment of the invention.

As indicated above, these processes may be performed in any storage system configuration. An example of a storage system employing these methods is shown in FIG. 3. As shown, the system includes a plurality of clients 50 (of which one is shown), data agents 60, sub-clients 62, 64, a data store 70, a storage manager (or storage management component) 80, a jobs agent 85, a storage manager index 90, one or more media management components (or media agent) 100, one or more media management component indexes 110, and one or more storage devices 120. Although FIG. 3 depicts a system having two media management components 100, there may be one media management component 100, or a plurality of media management components 100, providing communication between client 50, storage manager 80 and storage devices 120. In addition, the system may include one or a plurality of storage devices 120.

A client 50 may be any networked client 50 and typically includes at least one attached data store 70. The data store 70 may be any memory device or local data storage device known in the art, such as a hard drive, CD-ROM drive, tape drive, RAM, or other types of magnetic, optical, digital and/or analog local storage. The data store 70 includes sub-client 162 and sub-client 264. The sub-clients 62, 64 are generally used to identify portions of data in the data store 70. A sub-client typically contains a subset of the client applications. Although there are two sub-clients shown in FIG. 3, one or more sub-clients may be created for a client computer, as explained further above.

In some embodiments of the invention, client 50 includes at least one data agent 60, which is a software module that is generally responsible for performing storage operations on data of a client 50 stored in data store 70 or other memory location. Storage operations include, but are not limited to, creation, storage, retrieval, migration, deletion, and tracking of primary or production volume data, secondary volume data, primary copies, secondary copies, auxiliary copies, snapshot copies, backup copies, incremental copies, differential copies, synthetic copies, HSM copies, archive copies, Information Lifecycle Management ("ILM") copies, and other types of copies and versions of electronic data. In some embodiments of the invention, the system provides at least one, and typically, a plurality of data agents 60 for each client, each data agent 60 is intended to backup, migrate, and recover data associated with a different application. For example, a client 50 may have different individual data agents 60 designed to handle Microsoft Exchange data, Lotus Notes data, Microsoft Windows file system data, Microsoft Active Directory Objects data, and other types of data known in the art.

The storage manager 80 is generally a software module or application that coordinates and controls the system, for example, storage manager 80 manages and controls storage operations performed by the system. The storage manager 80 communicates with all components of the system including client 50, data agent 60, media management components 100, and storage devices 120 to initiate and manage storage operations. The storage manager 80 preferably has an index 90, further described herein, for storing data related to storage operations. In general, the storage manager 80 communicates with storage devices 120 via a media management component 100. In some embodiments, the storage manager 80 communicates directly with the storage devices 120 (not shown in FIG. 3).

The system includes one or more media management components 100. The media management component 100 is generally a software module that conducts data, as directed by storage manager 80, between client 50 and one or more storage devices 120, for example, a tape library, a hard drive, a magnetic media storage device, an optical media storage device, or other storage device. The media management component 100 is communicatively coupled with and controls the storage device 120. For example, the media management component 100 might instruct a storage device 120 to perform a storage operation, e.g., archive, migrate, or restore application specific data. The media management component 100 generally communicates with the storage device 120 via a local bus such as a Small Computer System Interface (SCSI) adaptor.

Each media management component 100 maintains an index cache 110, which stores index data that the system generates during storage operations as further described herein. For example, storage operations for Microsoft Exchange data generate index data. Media management index data includes, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data thus provides the system with an efficient mechanism for performing storage operations including locating user files for recovery operations and for managing and tracking stored data.

The system generally maintains two copies of the media management index data regarding particular stored data. A first copy is generally stored with the data copied to a storage device 120. Thus, a tape may contain the stored data as well as index information related to the stored data. In the event of a system restore, the index data stored with the stored data can be used to rebuild media management component index 110 or other index useful in performing storage operations. In addition, media management component 100 that controls the storage operation also generally writes an additional copy of the index data to its index cache 110. The data in media management component index cache 110 is generally stored on faster media, such as magnetic media, and is thus readily available to the system for use in storage operations and other activities without having to be first retrieved from storage device 120.

The storage manager 80 also maintains an index cache 90. Storage manager index data is used to indicate, track, and associate logical relationships and associations between components of the system, user preferences, management tasks, and other useful data. For example, storage manager 80 might use its index cache 90 to track logical associations between media management components 100 and storage devices 120. The storage manager 80 may also use its index cache 90 to track the status of storage operations to be performed, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information.

A storage policy is generally a data structure or other information, which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

Index caches 90 and 110 typically reside on their corresponding storage component's hard disk or other fixed storage device. For example, jobs agent 85 of a storage manager component 80 may retrieve storage manager index 90 data regarding a storage policy and storage operation to be performed or scheduled for a particular client 50. The jobs agent 85, either directly or via another system module, communicates with the data agent 60 at the client 50 regarding the storage operation. In some embodiments, jobs agent 85 also retrieves from index cache 90 a storage policy associated with client 50 and uses information from the storage policy to communicate to data agent 60 one or more media management components 100 associated with performing storage operations for that particular client 50 as well as other information regarding the storage operation to be performed such as retention criteria, encryption criteria, streaming criteria, etc. The data agent 60 then packages or otherwise manipulates the client data stored in client data store 70 in accordance with the storage policy information and/or according to a user preference, and communicates this client data to the appropriate media management component(s) 100 for processing. The media management component(s) 100 store the data according to storage preferences associated with the storage policy including storing the generated index data with the stored data, as well as storing a copy of the generated index data in media management component index cache 110.

In some embodiments, components of the system may reside and execute on the same computer. In some embodiments, a client component such as data agent 60, media management component 100, or storage manager 80 coordinates and directs local archiving, migration, and retrieval application functions as further described in application Ser. No. 09/610,738. These client components may function independently or together with other similar client components.

Figure 4:
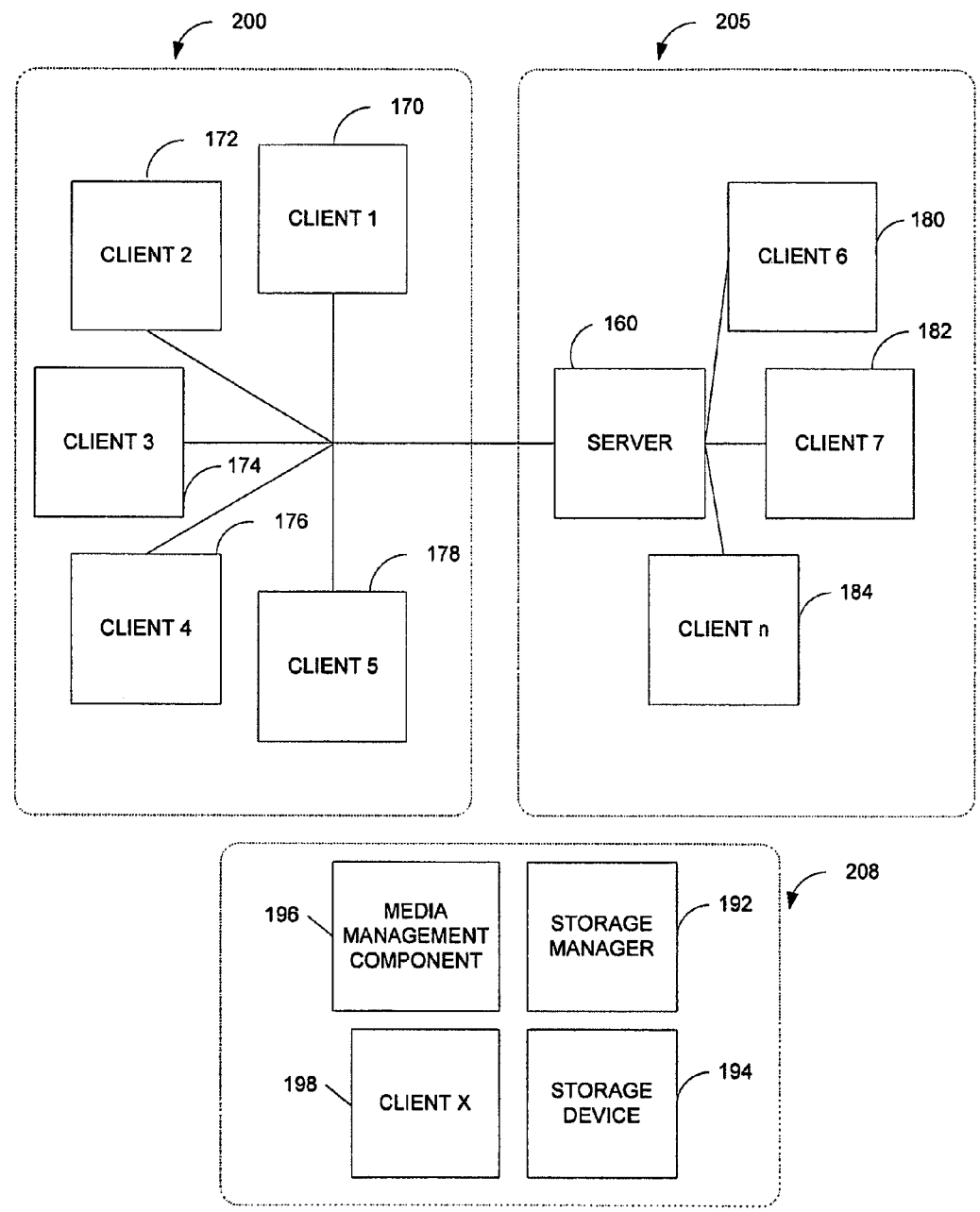
FIG. 4 is a block diagram of an example of associated storage system components according to one embodiment of the invention.

Referring to FIG. 4, storage system components may be associated with other storage system components to form a group, such as a component group. The component group is a logical arrangement of one or more storage components. Other component groups may also be formed that represent logical arrangements of one or more system components. For example, a component group may be formed having one or more client and server components logically arranged in a group, a storage device group may be formed having one or more storage devices logically arranged in a group, or other groups of storage system components, etc. A group of portions of volumes in clients may also be arranged. In essence, any identifiable component, which can be operated upon by a storage operation, can become an element of a storage group.

Examples of representative component groups described herein include a client group, client-server group and heterogeneous component group. Examples of client group 200, client-server group 205 and heterogeneous component group 208 are shown in FIG. 2. Client group 200 includes clients 1-5, 170-178 which are logically associated in a group. According to one embodiment of the invention, each of the clients 1-5, 170-178 are associated with similar storage preferences, further described herein. Similarly, clients 6-$n$, 180-184 and server 160 are logically associated in a client-server group 205, and storage manager 192, storage device 194, media management component 196, and client X 198 are logically arranged in a heterogeneous component group 208.

Each of the components in the component groups 200, 205 and 208 are associated to have similar storage preferences, further described herein. As shown, a client group 200, client-server group 205, heterogeneous group 208, and similarly, any other component group may contain one or more components. When a component is associated with another component in a group, data relating to the association of the group is stored as index data in the storage manager index or media management component index.

A component group typically has a defined storage policy, sub-client policy, user preferences or other defined storage preferences. Data relating to the storage policy, sub-client policy, user preferences or other defined storage preferences assigned to the component group are stored in an index, such as the storage manager index. In general, a storage policy defines preferences and procedures for all devices in the associated group. User preferences may be any storage operation preferences set by an administrator or other system user, and which generally overlap with preferences set forth in a storage policy, sub-client policy, or other storage preferences. Other storage preferences that may be set in a storage policy include:

- data security settings;
- encryption settings;
- data retention requirements;
- frequency of storage operations such as back ups;
- types of data for storage operations such as back ups;
- types of storage operations to perform in the component group;
- network pathways for use in performing a storage operation;
- scheduling such as a schedule of storage operations; and
- reports such as automatic generation of system reports regarding the group.

Each component in a component group inherits the component group's defined storage policy, sub-client policy, user preferences or other defined storage preferences. For example, when a client or other component is associated with a group, the storage preferences associated with the group are also associated with the client or component added to the group. Thus, new clients inherit the new storage policy, sub-client policy, user preferences or other defined storage preferences. For example, when a new client is added to a group, the new client inherits the jobs scheduled for the group to which it was added. The storage preferences inherited by the new client are updated to the media management index.

Several different techniques and data structures may be used to maintain the associations of clients, sub-clients, and other devices and software with a group, and to maintain the association of a group with a storage policy or preference set. In some embodiments, a simple data structure such as a look up table may be used to match up groups, identified through names or other identifiers assigned by an administrator or generated based on the characteristics of the group, with the component(s) listed to be in that group and the policy or policies associated with the group. Alternatively, a relational database may be employed in which, for example, each group has a series of records in a table identifying the components in the group, and one or more other tables are associated with the group tables to create links between groups and storage policies and between groups and other properties. In an object oriented programming system, the groups may be defined as classes of objects where each object represents the properties or characteristics of the group and further contains the storage policy or a link or pointer to the storage policy associated with the group. Each new component determined or identified to be associated with the group would then instantiated as an instance of the object class for that group. One skilled in the art of programming would recognize that other programming techniques or data structures may be employed to similar effect and are included within the scope of the present invention.

Figure 5:
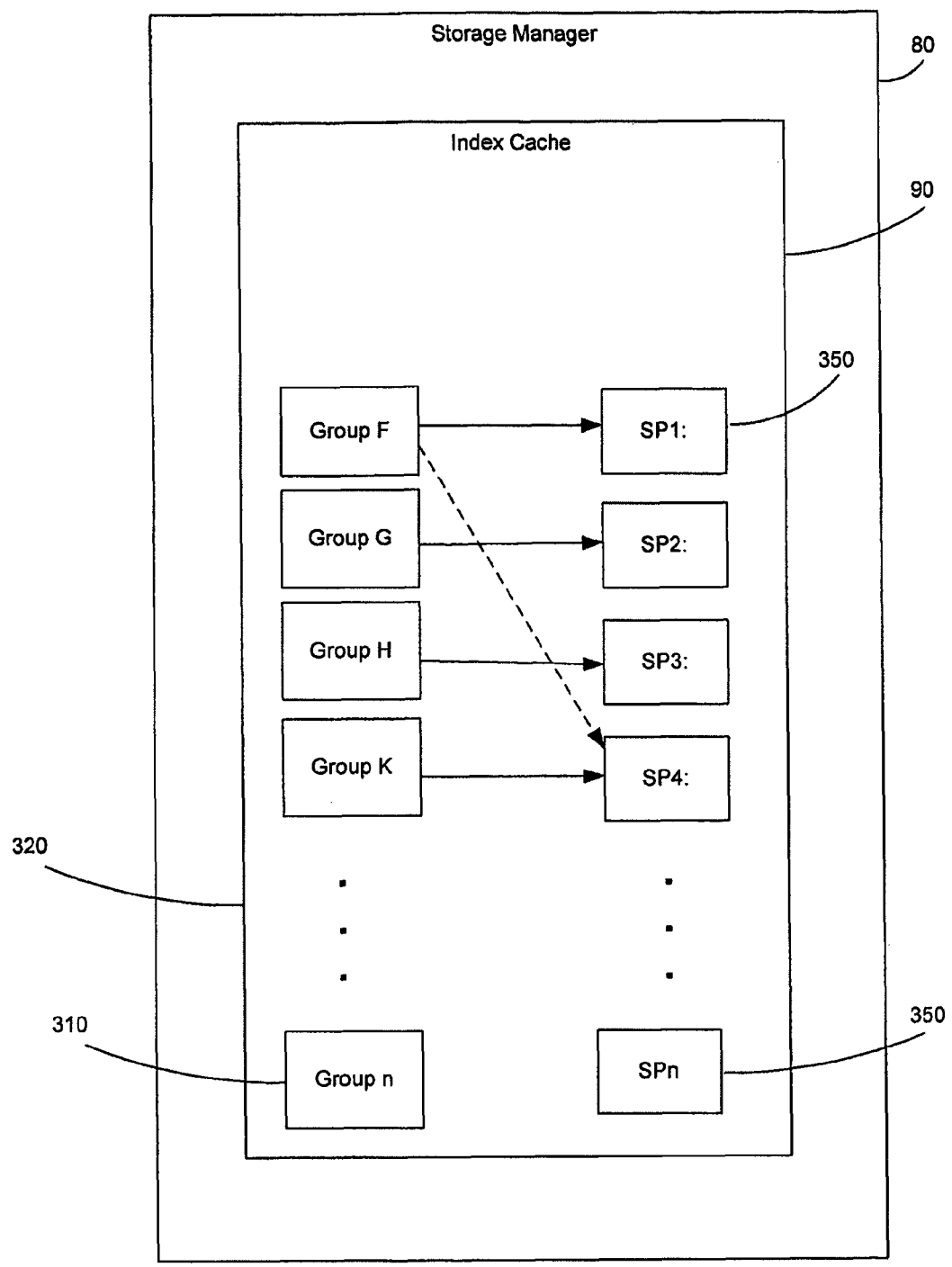
FIG. 5 is a block diagram depicting an index cache within a storage manager in accordance with one embodiment of the invention.

An example data structure for storing groups and their associations with policies is shown in FIG. 5. As shown in FIG. 5, the index cache 90 accessible to storage manager 80 contains a mapping between logical storage groups $SG_1$, $SG_2$, $SG_3$, $SG_4$, . . . , $SG_n$, and respective storage procedures 350, labeled $SP_1$, $SP_2$, $SP_3$, $SP_4$, . . . , $SP_n$. As shown, group $SG_1$ is mapped with storage procedure $SP_1$. If the administrator desires to change the storage procedure associated with all of the data in-group $SG_1$, the administrator may simply reassign that group to, for example, storage procedure $SP_4$—such a potential reassignment being shown in FIG. 5 through a dotted line. In this way, instead of requiring the administrator to enter a change for every portion of data in-group $SG_1$, the administrator may simply make one change in mapping. Similarly, if a storage system component changed its characteristics such that it switched from group $SG_2$ to $SG_3$, the storage policy that would apply to that component would automatically be switched from $SP_2$ to $SP_3$. Although not shown in FIG. 5, it is understood that multiple groups may be mapped to one storage policy, and that one group may be mapped to multiple storage policies.

In general, a user or administrator may define a component group to have any storage policy, sub-client policy, user preference or other storage preference. In addition, each client can be divided such that one or more sub-clients or one or more sub sets of a data store of a client can be associated in different component groups. For example, sub-client 1 of client I may be associated with component group 1, sub-client 2 of client 1 may be associated with component group 2 and component group 3. The storage policy, sub-client policy, user preference or other storage preferences of each component group is inherited by the component associated with the component group. A particular group of volumes 160 may store similar data for an application, file system, operating system or any other type of data. When configuring the storage operations for an application, a plurality of storage groups F, G, H and K are created which logically group portions 170 of data stores 90. This is accomplished by assigning a logical name space to the physical location of portions of data 170 residing on a particular hard disk HD w, x, y and z.

Components, such as clients, may be associated with one or more groups. For example, a client may be associated with a client group, a client-server group or a heterogeneous group. In the event that a component is associated with more than one group, the component receives the storage policies, sub-client policies, user preferences or other defined storage preferences for each group. A component's association with more than one group can lead to, for example, overlapping back up operations or other duplicative storage operations. This overlap is useful in some systems to provide additional data back up protection. There are conflicting aspects of the overlapping operations of preferences in the storage policies to which a component is associated. To resolve this problem, the groups may be stored in a hierarchy of groups or otherwise prioritized, so that the policy of the group higher in the hierarchy than other groups, or otherwise having a higher priority, would control over groups lower in the hierarchy. In alternative embodiments, a given component that could be associated with two or more groups would only be assigned to the group having the higher priority.

Figure 6:
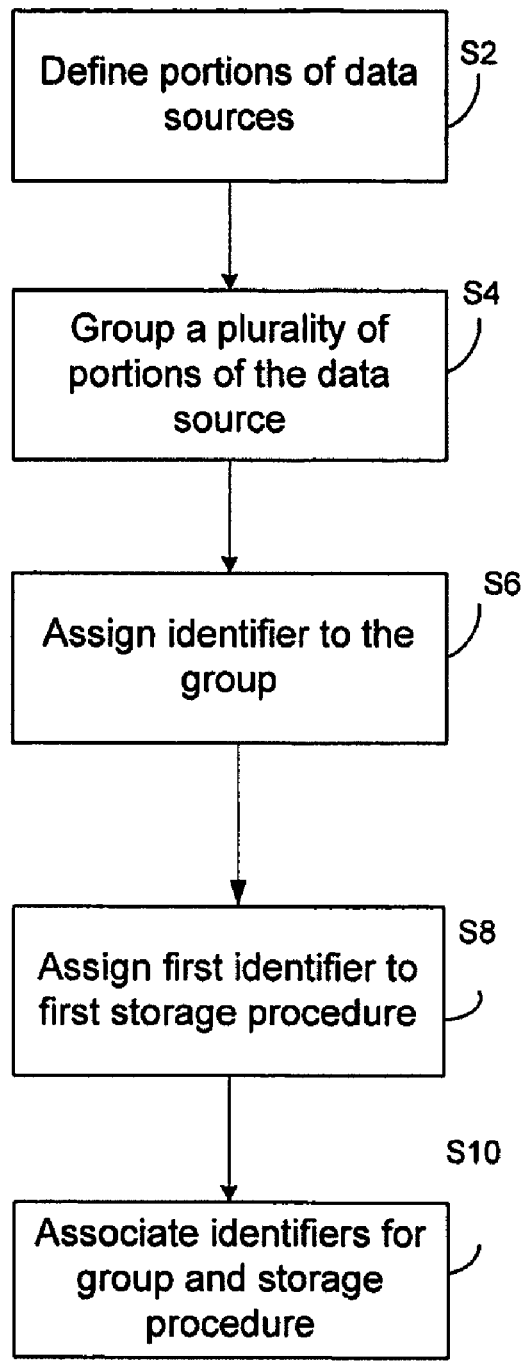
FIG. 6 is a flow chart of a method for initializing storage operations on electronic data in a computer network according to one embodiment of the invention.

Referring to FIG. 6, there is shown a flow chart of a method for initializing a storage operation on electronic data in a computer network according to an embodiment of the invention. The method in FIG. 6 could be used with, for example, the systems described with reference to FIGS. 3 and 4. At step S2, an administrator defines portions of data sources for data stores in the network. These portions could be entire volumes or portions of volumes and may be on a single computer or across multiple computers including use of network attached storage. At step S4, the administrator groups together a plurality of the portions into a logical group. For example, all the MICROSOFT EXCHANGE application data on data stores may be grouped together. At step S6, an identifier is assigned to the group. At step S8, the administrator assigns another respective identifier for each storage procedure used in the system. At step S10, the administrator associates the identifier for the group with the identifier for a desired storage procedure for the group.

Figure 7:
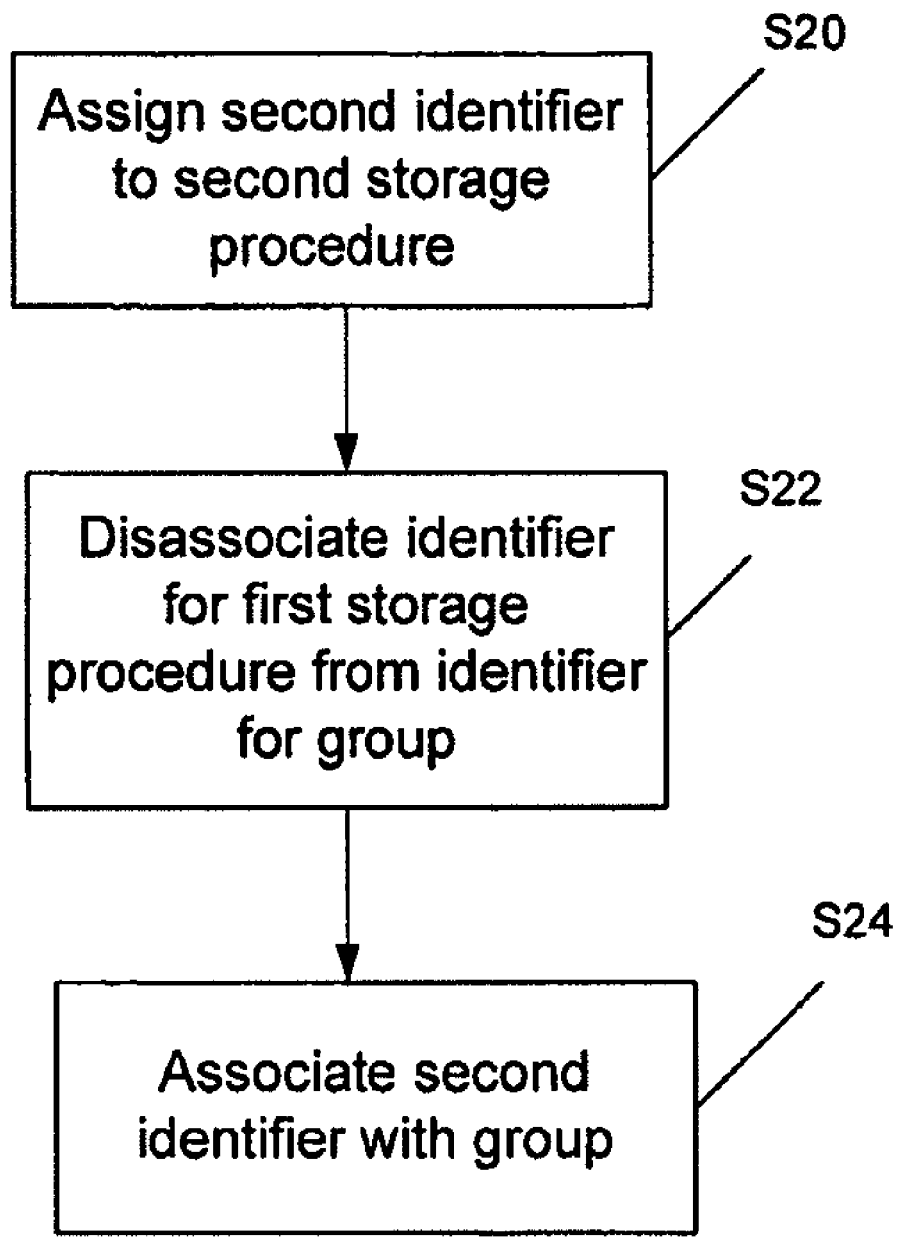
FIG. 7 is a flow chart of a method for updating a storage procedure assigned in a computer network according to one embodiment of the invention.

Referring to FIG. 7, there is shown a process for changing storage procedures in accordance with an embodiment of the invention. The process shown in FIG. 7 could be implemented using, for example, the system described in FIGS. 3-4. As shown in FIG. 7, at step S20, a second identifier is assigned to a second storage procedure. At step S22, the identifier associated with the first storage procedure is disassociated from the group defined in step S4. At step S24, the second identifier is associated with the group.

From the perspective of an administrator or other system user, users may administer and track preferences relating to component groups or other component groups, such as system resource requirements, network pathways, administrative access to system components, storage cost, resource use, or other preferences. Tracking storage costs by component groups provides an easier way to bill a user or client for the resources utilized. An example of a costing metric is further described in patent application Ser. No. 60/567,178. Thus, the component groups also provide an efficient means to monitor and administer a network at a high level.

Figure 8:
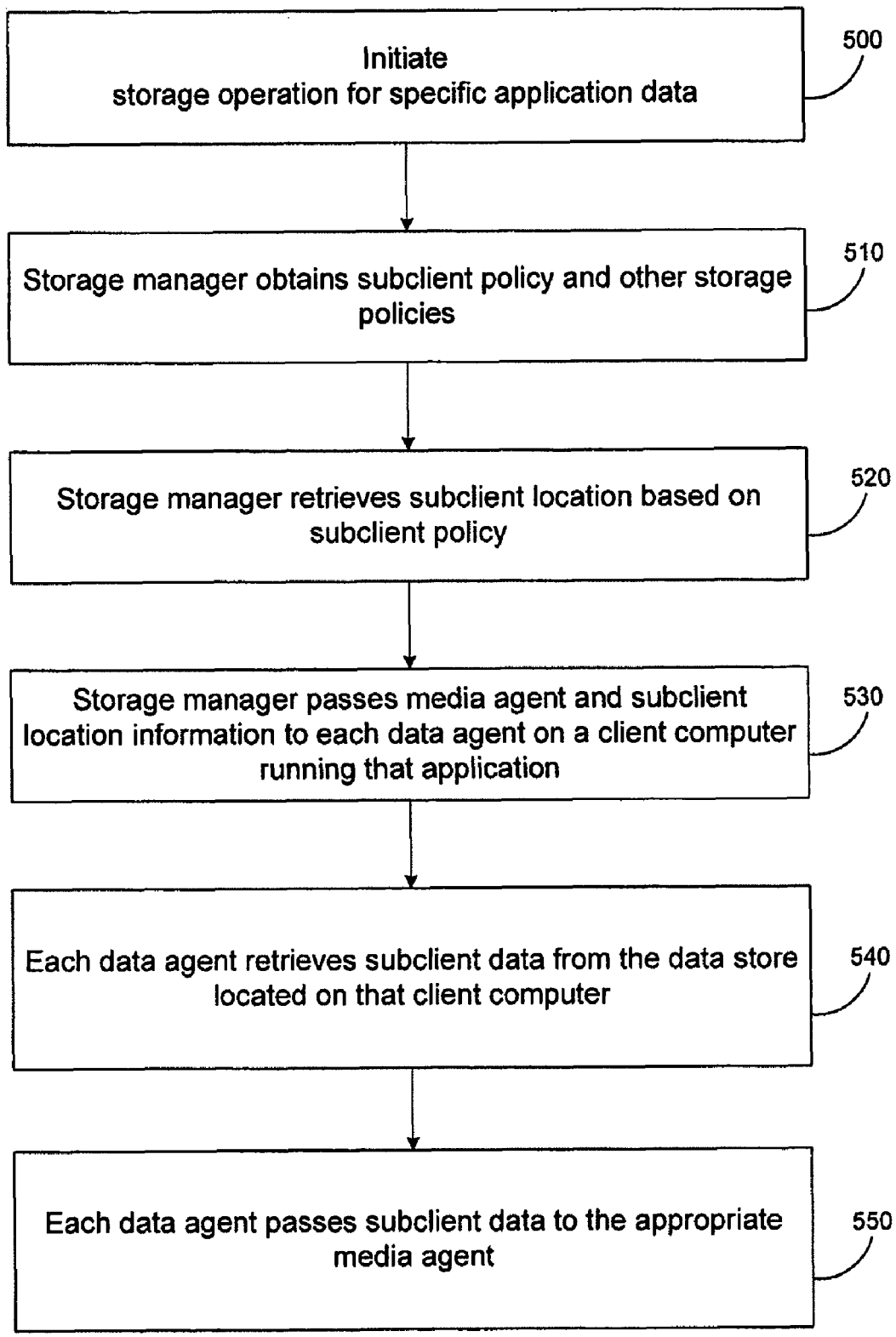
FIG. 8 is a flow chart of a method for performing a storage operation according to one embodiment of the invention.

As explained above, storage operations are performed in accordance with the inventions described herein by applying the storage policies associated with components on which the storage operations are to be performed. A process for applying storage policies in the context of sub-clients is illustrated by FIG. 8. A storage operation may be initiated for specific application data, step 500. In general, the storage operation may be initiated by a user or administrator, or automatically initiated by a storage manager, media agent or other system component based on a storage policy, as described herein. Upon initiation of the storage operation, a storage manager obtains a storage policy, such as a sub-client policy, step 510, associated with the specific application data that is the target of the storage operation and any other storage policies associated with the storage system components on which the application data is stored. For example, MICROSOFT EXCHANGE data may be associated with a sub-client policy which indicates that such application data is to be copied daily using one or more particular devices or components and the device on which the EXCHANGE data is stored may be associated with another storage policy.

The storage manager retrieves a sub-client location based on the sub-client policy, step 520. The sub-client location may be identified by consulting an index entry, such as a look up table, relating to the sub-client policy. Such an index entry may be a listing of system components, including sub-clients, or other index entry. Information relating to the sub-client location and media agent is communicated from a storage manager to a data agent, step 530. As described further herein, the data agent is typically associated with a client computer and may be a software module for performing storage operations on application specific data generated by the client computer, such as the application data that is the target of the storage operation. The data agent retrieves sub-client data from a data store located on the client computer, step 540. The retrieved sub-client data is transmitted or otherwise made available to an appropriate media agent, step 550, for performing the storage operation on a storage device through a copy operation performed in accordance with any preferences set forth in the storage policy.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for grouping networked storage system components, the method comprising:

associating with one or more computer processors a first group of clients and storage system components with a first storage policy which defines one or more retention storage preferences, wherein the retention storage preferences of the first storage policy are associated with one or more storage operations that are to be performed by at least one of the storage system components in the first group;

associating with one or more computer processors a second group of clients and storage system components with a second storage policy which defines one or more retention storage preferences, wherein the retention storage preferences of the second storage policy are associated with one or more storage operations that are to be performed by the storage system components in the second group;

reassigning at least a first client associated with the first group to both the first group and the second group, wherein the first client automatically inherits the second storage policy associated with the second group while retaining the storage policy associated with the first group, and in the event a first storage operation associated with the first storage policy conflicts with a second storage operation associated the second storage policy, the storage policy associated with a higher priority controls; and performing one or more storage operations associated with the storage policy with the higher priority.

2. The method of claim 1, wherein when a first storage system component of the one or more storage system components associated with the first group is reassigned to both the first group and the second group, the first storage system component automatically inherits the second storage policy associated with the second group while retaining the first storage policy associated with the first group.

3. The method of claim 1, wherein in the event a non-conflict storage operation associated with the first storage policy is to be performed on a reassigned storage system component, performing the non-conflict storage operation in accordance with the first storage policy.

4. The method of claim 1, wherein in the event a non-conflict storage operation associated with the second storage policy is to be performed on a reassigned storage system component, performing the non-conflict storage operation in accordance with the second storage policy.

5. The method of claim 1, further comprising assigning storage system components to one or more groups and selecting storage system components for a group based on the storage system components having a common characteristic.

6. The method of claim 1, wherein the storage system components further comprise sub-client components of a plurality of clients, the clients being data sources for the storage operation.

7. A computer system for grouping networked storage system components, the system comprising:
multiple clients and storage system components comprising one or more computer processors, wherein at least a first client and one or more storage system components are associated with a first group and at least a second client and one or more storage system components are associated with a second group;
at least a first storage policy which defines one or more retention storage preferences associated with the first group, wherein the retention storage preferences of the first storage policy are associated with one or more storage operations that are to be performed by at least one of the storage system components in the first group;
at least a second storage policy defining one or more retention storage preferences associated with the second group, wherein the retention storage preferences of the second storage policy are associated with one or more storage operations that are to be performed by at least one of the storage system components in the second group; and
wherein in the event the first client is reassigned to both the first group and the second group the first client automatically inherits the second storage policy associated with the second group while retaining the storage policy associated with the first group, and in the event a first storage operation associated with the first storage policy conflicts with a second storage operation associated with the second storage policy, the storage policy associated with a higher priority controls; and
wherein one or more storage operations associated with the storage policy with the higher priority are performed.

8. The computer system of claim 7, wherein when a first storage system component of the one or more storage system components associated with the first group is reassigned to both the first group and the second group, the first storage system component automatically inherits the second storage policy associated with the second group while retaining the first storage policy associated with the first group.

9. The computer system of claim 7, wherein in the event a non-conflict storage operation associated with the first storage policy is to be performed on a reassigned storage system component, performing the non-conflict storage operation in accordance with the first storage policy.

10. The computer system of claim 7, wherein in the event a non-conflict storage operation associated with the second storage policy is to be performed on a reassigned storage system component, performing the non-conflict storage operation in accordance with the second storage policy.

11. The computer system of claim 7, comprising assigning storage system components to one or more groups and selecting storage system components for a group based on the storage system components having a common characteristic.

12. The computer system of claim 7, wherein the storage system components comprise sub-client components of a plurality of clients, the clients being data sources for the storage operation.

* * * * *